United States Patent [19]

Hervot et al.

[11] 4,168,142

[45] Sep. 18, 1979

[54] HALOGEN-CONTAINING ESTERS AS PH REGULATORS IN TEXTILE FINISHING PROCESSES

[75] Inventors: Emmanuel Hervot, Bonnières; Yves René, Poissy; Alain Verdoucq, St. Germain en Laye, all of France

[73] Assignee: Sandoz Ltd., Basel, Switzerland

[21] Appl. No.: 874,716

[22] Filed: Feb. 2, 1978

[30] Foreign Application Priority Data

Feb. 4, 1977 [GB] United Kingdom ................ 4646/77

[51] Int. Cl.[2] ........................ C09B 67/00; D06L 3/00

[52] U.S. Cl. ........................................ 8/101; 8/1 XB; 8/1 W; 8/21 C; 8/54; 8/92; 8/94 A; 8/178 R

[58] Field of Search ................. 8/92, 94 A, 101, 1 W

[56] References Cited

U.S. PATENT DOCUMENTS

| | | | |
|---|---|---|---|
| 3,475,771 | 11/1969 | Quynn | 8/92 |
| 4,055,393 | 10/1977 | Schafer et al. | 8/94 A |

FOREIGN PATENT DOCUMENTS

| | | |
|---|---|---|
| 846332 | 9/1975 | Belgium . |
| 716990 | 10/1954 | United Kingdom . |

OTHER PUBLICATIONS

Hannay, R. J. and Major, W. H., *J. Soc. Dyers and Colourists,* 1953, 69, 195-200.

*Primary Examiner*—A. Lionel Clingman

*Attorney, Agent, or Firm*—Gerald D. Sharkin; Richard E. Vila; Thomas C. Doyle

[57] ABSTRACT

Disclosed is a textile finishing process in which there is employed, as pH regulator, a compound or mixture of compounds of formula I,

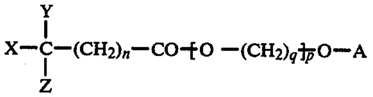

I in which n is 0 or 1, p is 0 or an integer from 1 to 6, q is 2 or 3,

X is a halogen, each of

Y and Z, independently, is hydrogen or halogen, and

A is hydrogen, phenyl, $C_{1-12}$alkyl, or a radical of formula (a), (b) or (c),

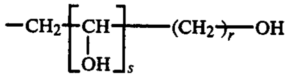

(a),

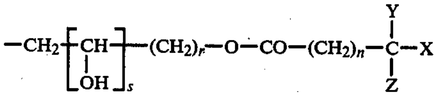

(b)

or

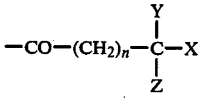

(c)

where r is 1 to 4, s is 0 or an integer from 1 to 4,

X, Y Z and n are as defined above, with the proviso that p is other than 0 when A is hydrogen or a radical of formula (c).

14 Claims, No Drawings

HALOGEN-CONTAINING ESTERS AS PH REGULATORS IN TEXTILE FINISHING PROCESSES

The present invention relates to a textile treatment process.

According to the present invention, there is provided a textile finishing process in which there is employed, as pH regulator, a compound or mixture of compounds of formula I,

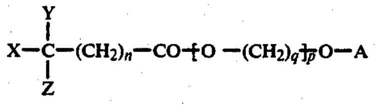

I in which n is 0 or 1, p is 0 or an integer from 1 to 6, q is 2 or 3,

X is a halogen, each of

Y and Z, independently, is hydrogen or halogen, and

A is hydrogen, phenyl, $C_{1-12}$ alkyl, or a radical of formula (a), (b) or (c),

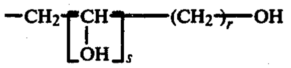

(a),

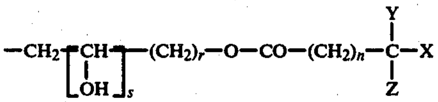

(b)

or

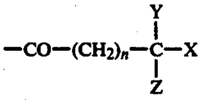

(c)

where r is 1 to 4, s is 0 or an integer from 1 to 4,

X, Y, Z and n are as defined above, with the proviso that p is other than 0 when A is hydrogen or a radical of formula (c).

By halogen, as used above, is to be understood fluorine, chlorine, bromine and iodine, chlorine being the preferred halogen.

In the compounds of formula I, n is preferably 0. q is preferably 2. Y and Z are preferably both hydrogen. p preferably signifies 0, 1, 2 or 3. Where A signifies an alkyl radical such may be straight or branched, preferred alkyl radicals being ethyl, butyl and 2-ethylhexyl. Where, however, p is 0 and A is an alkyl radical, such alkyl radical preferably contains 4 to 8 carbon atoms. Where A is hydrogen or phenyl, p is preferably 1 or 2, more preferably 1.

As a preferred class of compounds of formula I, may be given the compounds of formula I', $$X-CH_2-CO[O-(CH_2)_2]_{p'}-O-A' \qquad I'$$

where X is as defined above, and either p' is 0 and A' is $C_{4-8}$ alkyl, a radical (a), above, in which s is 1, or a radical (b), above, where s is 1, n is 0 and Y and Z are both hydrogen, or p' is 1 to 4 and A' is hydrogen, methyl, ethyl, butyl, phenyl, a radical (a), above, in which s is 0, a radical (b), above, in which s is 0, n is 0 and Y and Z are both hydrogen, or a radical (c), above, in which n is 0 and Y and Z are both hydrogen.

As a further preferred class may be given the compounds of formula I'', $$Cl-CH_2-CO[O-(CH_2)_2]_{p''}-O-A'' \qquad I''$$

where p'' is 1 or 2 and A'' is hydrogen, ethyl, phenyl or a radical $—CO—CH_2Cl$.

In the above compounds I' and I'', A' or A'' is preferably hydrogen or a radical $—CO—CH_2X$ ($—CO—CH_2Cl$ in the case of A'').

The compounds of formula I are either known or may be obtained in conventional manner from available starting materials, for example they may be obtained by reacting a compound of formula II,

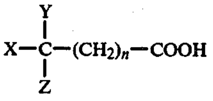

II with a compound of formula III, $$H[O-(CH_2)_q]_p O-A''' \qquad III$$

where A''' is hydrogen, phenyl, $C_{1-12}$ alkyl or a radical (a), above, with the proviso that p must be different from 0 when A''' is hydrogen.

As will be appreciated, where the compound III is a diol (i.e. A''' is hydrogen or a radical (a), above) a mixture of products will likely be obtained, i.e. of a compound of formula I, wherein A is hydrogen or a radical (a) along with a compound of formula I wherein A is a radical of formula (c) or (b), respectively. Such mixtures may, if desired, be separated, or used as such in the process of the invention.

The reaction of the compound II with the compound III may be carried out in conventional manner, e.g. at a temperature of from 100° to 160° C. over 3 to 7 hours, suitably the temperature being raised progressively throughout the reaction.

The resulting compounds of formula I may be isolated and purified.

The compounds of formula I, in the textile finishing process of the invention act as acid generators, arising from their hydrolysis in the finishing liquor, the hydrolysis taking place gradually with formation and liberation of the corresponding acids, in general with a consequent lowering of the pH of the finishing liquor. The use of the compounds of formula I enable finishing to be carried out at a variable pH at either constant or variable temperature. In general, the compounds are employed to bring about a gradual reduction of the pH of the finishing liquor, e.g. in cases where the finishing agent performs its function or is fixed under acid conditions. This gradual reduction in pH causes the finishing agent to perform its function progressively, leading to more regular or level results. However, the compounds may alternatively be used for stabilising the pH of an acid finishing liquor e.g. where there is a tendency for the pH to rise, (e.g. where industrial water is employed containing alkaline salts which, by dissociation, would cause alkalinisation of the liquor).

As regards the substrates on which the process of the invention is suitably carried out, these are substrates which lend themselves to finishing under acid conditions and, as examples, may be given substrates comprising or consisting of cellulose hemi-penta acetate, diacetate or triacetate, of optionally modified polypropylene, polyester or polyacrylonitrile, and, in particular, of natural fibres such as wool and silk and of synthetic polyamide, optionally modified. By synthetic polyamide is to be understood particularly polymers of 1'ε-caprolactam, and condensation products of dicarboxylic acids, e.g. polymethylene carboxylic acids such as adipic acid, with polymethylene diamines such as hexamethylene diamine, examples being nylon 6, nylon 11, nylon 66, nylon 610 etc. The substrate may be a blend, e.g. a mixture of the above one with another or with other fibres, as particular examples being given mixtures of different polyamides, mixtures of polyamide with cellulose, mixtures of polyester and wool and mixtures of polyester and cellulose triacetate. The substrate may be in any conventional form, e.g. fibre, filament, yarn, woven, non-woven, knitted or carpet form.

By finishing, as used herein, is intended to be included dyeing, optical brightening, bleach-oxidizing and, indeed, any conventional textile treatment process needing acid conditions for the agents employed to perform their function, dyeing being of particular interest.

In dyeing, the dyes employed may, for example, be acid dyes, metaliferous dyes, particularly 1:2 metaliferous dyes, disperse dyes, reactive dyes and basic dyes, such dyes being, for example, described in the publication of H. R. Schweizer, "Kunstliche organische Farbstoffe", volume 1, VCS edition (1959). The choice of dye depends, of course, on the nature of the substrate to be dyed.

The rate at which the pH of the finishing liquor is reduced in the process of the invention or the accuracy by which the pH is maintained, depends on such factors as the rate of hydrolysis of the particular compound of formula I chosen, the temperature of the liquor, the rate at which the temperature of the liquor is raised, the nature of the finishing agent and auxiliaries in the liquor, the concentration of the compound or mixture of compounds of formula I employed, the initial pH of the liquor, the nature of any basic compounds added to the liquor and the total alkaline titration of the water used to form the liquor.

The process of the invention may be carried out at temperatures conventional for finishing processes carried out under acid conditions. For example, depending on the nature of the finishing agent employed and the substrate being finished, the process of the invention may be carried out at relatively low temperatures, e.g. from 20° to 50° C., at elevated temperatures, e.g. from 50° to 100° C., advantageously between 70° and 100° C. and particularly between 80° and 98° C. and at high temperatures, e.g. up to 160° C., preferably between 100° and 140° C. as in beam dyeing. Conventional liquor to goods ratios may also be used, e.g. from 1:1 to 50:1.

In dyeing processes, dye fixation can be effected at from 20° to 60° C., preferably from 20° to 40° C. over a period of from 1 to 48 hours, preferably 2 to 24 hours. Fixation may also be effected at high temperatures e.g. with saturated steam at 100° C. or with superheated steam up to 160° C., preferably from 140° to 160° C. or with dry air at from 120° to 300° C., preferably from 140° to 230° C.

The amount of the compound or mixture of compounds of formula I employed in the process of the invention depends, in addition to the desired final pH, on the nature of the substrate and finishing agent and, in the case of dyeing, on the desired depth of shade. Depending on the amount of compound or mixture of compounds of formula I employed, the pH of the finishing liquor or bath may be held stable or reduced progressively over the course of treatment.

In general, and particularly in dyeing operations, the pH at commencement of the process is between 5 and 10, preferably between 6 and 9 and, at termination is generally between 3 and 6.5, preferably between 4 and 6, the bath at the end of treatment being either more acidic or at least of the same acidity as at commencement. Generally, the pH value has changed from 0 to 6 pH units, preferably from 1 to 4 pH units, over the treatment period. The use of the compounds of formula I enables this pH content to be achieved and enables any pH reduction to be achieved relatively gradually.

The compound or mixture of compounds of formula I may be added on commencement, during or towards the end of the finishing process, in one or several additions or even continuously, for example, by a metering device, optionally controlled automatically according to a predetermined programme or in dependence on the pH of the liquor. Thus, in dyeing processes, the addition may be made at commencement of dyeing, in the course of any temperature rise, at any temperature holding stage and/or towards the end of the dyeing procedure.

The terminal pH to be attained is dependent on the nature of the finishing agent used and the intensity of the finishing action desired, e.g. depth of shade in the case of dyeing. These pH values are known.

The process of the invention enables the dyeing, with acid dyes, of differentially dyeable polyamide, i.e. polyamide substrates comprising parts with no tinctorial affinity, slight, medium or high tinctorial affinity, and the dyeing of substrates comprising both fibres dyeable with basic dyes and fibres dyeable with acid dyes where it is desired to carry out dyeing in the same bath with both types of dyes. In the latter case, the process of the invention enables the pH to be adjusted accurately to the necessary value of from about 5.5 to 6.

Since the compounds of formula I are relatively weakly soluble in water, they are preferably employed along with emulsifying agents, and compositions comprising one or more compounds of formula I together with an emulsifying agent form part of the present invention. Such compositions advantageously contain from 5 to 30%, preferably from 10 to 15%, of emulsifying agent based on the weight of the compound or mixture of compounds of formula I. The emulsifying agent may be of the non-ionic, anionic or amphoteric type and is preferably one enabling rapid emulsion formation and giving an emulsion stable to boiling. The preferred types are the non-ionic emulsifying agents, for example the addition products of ethylene oxide with mono or dialkylphenols e.g. wherein the alkyl radicals are of 5 to 12, particularly 8 to 10 carbon atoms, such as the polyglycol ethers of mono or dialkylphenols containing 5 to 10 ethyleneoxy units, polyethoxylated vegetable oils, e.g. castor oil ethoxylated with 20 to 40 units of ethylene oxide, or fatty acid esters of polyethylene glycols, and the anionic emulsifying agents, for example fatty alcohol sulphates, e.g. sodium lauryl sulphate, and alkyl sulpho-succinates, e.g. sodium dioctyl sulpho succinate, or mixtures thereof.

Depending on the desired pH variations, the compounds of formula I may be used along with other acid generators, for example lactones, e.g. γ-butyrolactone, or with acids or acid salts.

The substrate may be entered into the bath before or after addition of the compound or compounds of formula I and other additives, and the compound or compounds of formula I, along with the finishing agent and other additives may be added simultaneously to the substrate containing bath.

One embodiment of elevated temperature dyeing comprises impregnating a textile substrate for about 10 minutes at 30° C. with an aqueous bath containing a compound or mixture of compounds of formula I, the desired dyeing auxiliaries, for example a levelling agent, and, optionally, a basic compound to give an initial pH of from 7 to 9. The liquor to goods ratio may be any conventional in the art, long or short. The dyes are added to the bath which is then heated at the rate of 1.5° to 3.0° C. per minute and held at the boil for from 20 to 60 minutes.

As examples of basic compounds which may be employed to give an initial alkaline bath may be given sodium carbonate, borax, sodium acetate, ammonia and sodium hydroxide.

The process of the invention is applicable to a wide variety of operating procedures, e.g. discontinuous and continuous finishing procedures, to the so-called "Space-Dyeing" process and to printing processes, the acids conventionally used in such processes being replaced by the compounds of formula I.

Further, the process of the invention enables washing and dyeing to be carried out in the same bath, the washing being carried out in conventional manner, preferably using alkaline conditions. Dyes and auxiliaries are then added and the bath brought to the boil and, after 10 to 20 minutes at the boil, the compounds of formula I are added, e.g. over 15 to 60 minutes.

By the process of the invention unusually level dyeings and very good exhaustion of dye baths can be achieved on a wide variety of substrates.

As will be appreciated, preliminary testing may be necessary to arrive at the optimum working conditions, e.g. the optimum amount and time of addition of the compounds of formula I to obtain the desired pH variation or control. Such preliminary procedures and adjustment when necessary are, however, well within the skill of the man in the art.

The invention is further illustrated by the following Examples, in which all parts and percentages are by weight and the temperatures in degrees centigrade. The water employed for the production of the liquors in Examples 7 to 20, 22, 25 to 27 and 29 was permutite water with a T.A.T. (total alkaline titration) value of 20 to 24 and a pH of 7.3 to 7.4, that employed in Example 21 had a T.A.T. value of 8 and a pH of 7–8, that employed in Examples 23 and 24 had a T.A.T. value of 9 and a pH of 6.8, that employed in Example 28 had a T.A.T. value of 6 and a pH of 6.8 and that employed in Examples 30 and 31 had a T.A.T. of 9 and a pH of 7.8.

EXAMPLE 1

A mixture comprising 189 parts of chloroacetic acid and 124 parts of ethylene glycol are heated with stirring in a flask equipped with a water separator and a reflux. The reaction mixture is heated during the course of one hour so as to attain 120°, then the temperature is raised progressively to 135°–140°. After 4 hours of reaction at this temperature the reaction mixture is raised to 150° and maintained at this temperature for one hour. The loss of water during the course of the reaction is facilitated by a light current of nitrogen. A mixture is obtained containing principally ethylene glycol chloroacetate and a little of the corresponding di-ester; $n_D^{20}=1,458$.

EXAMPLE 2

A mixture comprising 189 parts of chloroacetic acid and 212 parts of diethylene glycol are heated while stirring in a flask equipped with a water separator and a reflux. Within one hour the temperature is raised to 120°, then progressively raised to 135°–140°. After 4 hours reaction at this temperature, the reaction mixture is raised to 150° and is maintained at this temperature for one hour. The loss of water during the course of the reaction is facilitated by a light current of nitrogen. Thus, a mixture is obtained containing principally the ethylene glycol chloroacetate and a little of the corresponding di-ester; $n_D^{20}=1,4615$.

EXAMPLE 3

Following the procedure described in Examples 1 and 2, 276 parts of 2-phenoxyethanol is reacted with 189 parts of chloroacetic acid. In this manner 2-phenoxyethyl chloroacetate; $n_D^{20}=1,523$, is obtained.

EXAMPLE 4

Following the procedure described in Examples 1 and 2, but heating while stirring for 4 hours to 105° a mixture comprising of 181 parts of butanol and 189 parts of chloroacetic acid, there is obtained butyl chloroacetate; $n_D^{20}=1,428$.

EXAMPLE 5

Proceeding as described in Examples 1 and 2 but heating for 4 hours at 140° a mixture comprising 260 parts of 2-ethyl-hexanol and 189 parts of chloroacetic acid, 2-ethyl-hexyl chloroacetate; $n_D^{20}=1,428$, is obtained.

EXAMPLE 6

Proceeding according to the methods of Examples 1 or 2, but employing appropriate starting materials, there is obtained, (a) ethyleneglycol dichloroacetate $n_D^{20}=1,471$
(b) glycerin chloroacetate $n_D^{20}=1,483$ or
(c) ethylene glycol trifluoroacetate $n_D^{20}=1,359$.
each containing a little of the corresponding diester.

EXAMPLE 7

90 Parts of the mixture of ethylene glycol chloroacetate and di-ester corresponding to that obtained in Example 1, 5 parts of an ester of oleic acid with a polyethylene glycol and 5 parts of a dipentyl phenol esterified by 5 ethyleneoxy groups, are mixed with stirring. The composition thus obtained, employed in an amount of 1 g/liter of fresh water, permits at the end of one hour's boiling a pH of 4.2 to be attained.

EXAMPLE 8

90 Parts of the mixture of diethylene glycol chloroacetate and di-ester corresponding to that obtained in Example 2 and 10 parts of a nonylphenol ethoxylated 9.5 times, are mixed under stirring. The composition thus obtained, used at the rate of 2 g/liter of fresh water, permits at the end of boiling a pH of 3.8 to be obtained.

EXAMPLE 9

70 Parts of 2-phenoxy ethyl chloroacetate, 15 parts of oleic acid esterified with a polyethylene glycol, and 15 parts of a dipentyl phenol esterified by 5 ethyleneoxy groups are mixed with stirring. The composition thus obtained, used to a proportion of 2 g/liter fresh water, after boiling for one hour, gives a pH of 3.9.

EXAMPLE 10

Following the procedures of Examples 7 to 9, above, but employing (a) 1 g/l of 80 parts ethylene glycol dichloroacetate in admixture with 20 parts of a nonyl phenol ethoxylated with 9.5 units of ethylene oxide, a final pH is obtained of 3.3.

(b) 1 g/l of a mixture of 90 parts glycerin chloro acetate, 5 parts of a polyethylene glycol oleic acid ester and 5 parts of dipentylphenol ethoxylated with 5 units of ethylene glycol, a final pH of 4.2 is obtained.

(c) 1 g/l of 90 parts of the product obtained in Example 1 comprising a mixture of ethylene glycol chloroacetate and its corresponding di-ester, 7 parts of poly(ca. 33×)ethoxylated castor oil, 3 parts of dioctylsulphosuccinate (sodium salt) and 80 parts ethylene glycol, a final pH of 4.5 to 4.6 is obtained.

(d) 1 g/l of ethylene glycol trifluoroacetate (no emulsifier being necessary because of its good water solubility), a final pH of 2.8 is obtained.

EXAMPLE 11

A polyamide 66 fabric is impregnated for 10 minutes at 30° in a rotating vessel containing 2.5% of a levelling agent and 0.4 ml per liter of the composition prepared in Example 7. The pH of this bath is first adjusted to 8 by addition of sodium carbonate. The liquor to goods ratio is between 20:1 and 30:1. The mixture is added after the addition of the following dyes:

0.58% C.I. Acid Orange 127
0.27% C.I. Acid Blue 280 and
0.11% C.I. Acid Red 299.

The dyebath is heated to a temperature of 94° at a rate of 3° per minute and dyeing is carried out at this temperature for 50 minutes. During dyeing the pH of the dyebath progressively falls; at the end of dyeing the pH is 6.3. A level brown dyeing is obtained and the bath is completely exhausted.

EXAMPLE 12

The procedure as described in Example 11 is carried out but using the following dyes:

0.7% C.I. Acid Blue 40,
0.24% of a mixture of C.I. Acid Red 57 and C.I. Acid Red 266, and
0.12% C.I. Acid Orange 156.

At the end of dyeing the pH is 6.1. A uniform grey-blue dyeing is obtained and the bath completely exhausted.

EXAMPLE 13

The procedure as described in Example 11 is carried out but using a mixture of the following dyes:

0.58% of a mixture of C.I. Acid Green 25, Acid Red 119 and Acid Red 299,
0.095% C.I. Acid Orange 127, and
0.008% C.I. Acid Red 299.

At the end of dyeing the pH is 6.3. A uniform grey dyeing and a very good bath exhaustion is obtained.

EXAMPLE 14

The procedure as described in Example 11 is carried out but using the following dyes:

0.6% C.I. Acid Orange 127,
0.28% of a mixture of C.I. Acid Green 25, Acid Red 119 and Acid Red 299, and
0.065% C.I. Acid Red 299.

At the end of dyeing the pH is 6.2. A uniform brown dyeing and a complete bath exhaustion is obtained.

EXAMPLE 15

The procedure as described in Example 11 is carried out but using the following dyes:

0.62% C.I. Acid Blue 280,
0.17% C.I. Acid Orange 127, and
0.1% C.I. Acid Red 299.

At the end of dyeing the pH is 6.2. A uniform grey dyeing is thus obtained and the dyes are exhausted.

EXAMPLE 16

The procedure as described in Example 11 is carried out but using an impregnation bath containing 0.8 ml per liter of the composition prepared in Example 7, and a mixture of the following dyes:

1.3% C.I. Acid Yellow 19 and
1.2% C.I. Acid Blue 72.

At the end of dyeing the pH is 5.3. A uniform green dyeing and very good bath exhaustion is obtained.

EXAMPLE 17

Treated wool Superwash Hercosett is impregnated for 10 minutes at 20° in a bath containing 1% of a levelling agent and, per liter, 1 g sodium acetate and 1 ml of the composition prepared according to Example 7. The pH of this bath was first adjusted to 6.8 by addition of acetic acid. The length of the bath is 1:20. The mixture is then added after addition of the dyes:

0.65% C.I. Reactive Yellow 25, and
1.4% C.I. Reactive Blue 169.

After 10 minutes dyeing at 20°, the dyebath is heated to 80° at a rate of 1° per minute then to 97° at a rate of 0.5° per minute. The substrate is dyed for one hour at 97°. Under these conditions, the pH is 6.8 at 20°, 5.9 at 97° and 5.3 after dyeing for one hour at 97°. After being cooled to 90°, the dye bath is adjusted to pH 7.8 and dyeing continued at 90° for 15 minutes and then rinsed. The dyed wool is of a uniform green shade. Total dye fixation and a remarkable linear exhaustion are obtained.

EXAMPLE 18

The procedure as described in Example 17 is carried out but the initial pH of the bath is adjusted to 6.2 by addition of acetic acid. C.I. Reactive Orange 53 is used in an amount of 3%. After dyeing for one hour at 97°, the pH attains the value of 4.7. A level orange dyeing and total exhaustion of the dye bath is obtained.

EXAMPLE 19

In a dyeing autoclave, a polyamide 6 fabric is impregnated for 15 minutes at 30° in a bath containing 5% levelling agent and 0.2 g per liter of the bath of borax. The following dyes are finally added:

1.1% C.I. Acid Yellow 151,
0.4% C.I. Acid Red 217, and
2.4% C.I. Acid Orange 82.

The length of the bath is 1:10. After having raised the bath temperature to 100° at a rate of 3° per minute, dyeing is carried out at this temperature for 10 minutes, whereafter 0.4 ml per liter of the bath of the composition prepared in Example 7 is added, and dyeing continued for 20 minutes, whereafter a further 0.2 ml per liter of the same composition of acid generator is added and dyeing continued for 30 minutes. At the end of this period, the dye is exhausted and the dyeing is uniform. The final pH is 5.6.

EXAMPLE 20

The procedure described in Example 19 is carried out except that after dyeing for 10 minutes at 100°, 1 ml per liter of γ-butyrolactone is added and dyeing continued for 45 minutes at 100°, 0.2 ml per liter of the composition prepared in Example 7 is added and dyeing continued for another 30 minutes. At the end of the dyeing the pH is 5.5. A good uniform dyeing and very good bath exhaustion is obtained.

EXAMPLE 21

In a winchback machine, a polyamide 6 carpet with a polypropylene backing is dyed in a bath containing, per 1000 parts, 0.1 part of the dye of formula

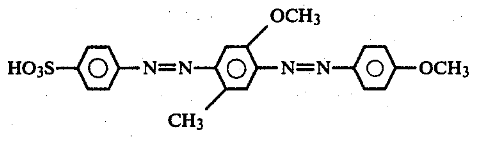

0.3 parts of C.I. Acid Red 57, 0.2 parts of C.I. Acid Blue 288, 0.6 parts of a levelling agent and 0.5 parts of borax. The liquor to goods ratio is 8:1.

The dyebath is rapidly heated to 90°-95°. After dyeing for 10 minutes at this temperature 0.75 parts of the composition prepared according to Example 7 are added. Dyeing is continued for another 30 to 60 minutes after which the carpet is treated in the usual way. A uniform beige dyeing and good bath exhaustion is obtained.

EXAMPLE 22

In an appropriate apparatus, for example a perforated drum machine, polyamide socks are dyed by spraying on to the material, at ambient temperature, a volume of a bath in an amount of 1.5 liter per 1 kg of material. The bath consists of, per 1000 parts, 15 parts of an appropriate chemical product assuring micro foam formation, 1.2 parts of C.I. Acid Orange 127, 250%, 2.25 parts of C.I. Acid Red 288, 200%, and 2 parts of the composition prepared according to Example 7. After distribution by mechanical action and development of the micro foam, the material is steamed for 20 minutes at 100°-102°. The red dyeing thus obtained is perfectly fixed, the dye having, at ambient temperature and at the distribution phase, a very reduced affinity in comparison with a comparable process using acetic acid to produce an acid medium with pH 4.

EXAMPLE 23

In an appropriate dyeing apparatus, interlock polyamide 6.6 textile in the form of tubular piece tricot is dyed, the liquor to goods ratio being 4:1. The material is impregnated for 10 minutes at 40° with a bath adjusted to pH 8 by addition of borax and containing 0.58% of C.I. Acid Orange 127, 0.110% of C.I. Acid Red 299, 0.270% of C.I. Acid Blue 280, 2% of an appropriate chemical product assuring micro foam formation and 0.3 ml per liter of the composition prepared according to Example 7. The indicated percentages are based on the weight of the material. Afterwards the bath is heated at a rate of 1° per minute to the boil and the dyeing fixed for 30 minutes at the boil. The final pH is 6.6. A uniform brown dyeing and good bath exhaustion is obtained.

EXAMPLE 24

Following the procedure of Example 23 but using the dyes:

0.7% C.I. Acid Blue 40

0.24% of a mixture of C.I. Acid Red 57 and C.I. Acid Red 266 and 0.125% C.I. Acid Orange 156 and 0.4 ml per liter of the composition prepared according to Example 7 a similar dyeing is carried out. The duration of fixation at the boil is 40 minutes. The dyebath is completely exhausted and the final pH is 6.3. A uniform grey dyeing is obtained.

EXAMPLE 25

On a dyeing apparatus of the winchback overflow type, are dyed pieces of prefixed and prewashed polyester/wool 55/45; the liquor to goods ratio being 15:1. The pieces are impregnated for 15 minutes at 60° in a bath containing, per liter, 2.2 ml of a bi-phenyl based carrier, 1 ml of a levelling agent and 1 ml of the composition prepared according to Example 7. The previously dispersed and dissolved dye is added, namely 1.5% of a mixture of C.I. Acid Orange 80, C.I. Acid Violet 66, C.I. Disperse Blue 56, C.I. Disperse Red 50, C.I. Disperse Red 60 and C.I. Disperse Yellow 23. The temperature of the bath is raised from 60° to 105° at a rate of 1° per minute and maintained at this temperature for 1 hour.

The development of the pH is as follows: 7.3 at the beginning, 6 at 95°, 5.2 after 20 minutes at 105° and 4.9 after one hour at 105°.

The brown dyeing obtained is uniform with excellent colour yield on both the polyester and wool.

EXAMPLE 26

In a dyeing autoclave, pieces of polyester/wool 55/45 are dyed under similar conditions to those of Example 25. The carrier used is based on trichlorobenzene and is employed at a rate of 1.8 ml per liter. The dye, applied at a rate of 1.5%, is a mixture of C.I. Acid Black 58, C.I. Disperse Blue 56, C.I. Disperse Red 50, C.I. Disperse Yellow 23. The development of the pH of the dyebath is more or less within 1/10 pH unit identical with that in Example 25.

A uniform grey dyeing is obtained.

EXAMPLE 27

In a dyeing autoclave is dyed a double knit prefixed polyester and triacetate 55/45 material with a bath containing, per liter, 0.5 ml of a levelling agent and 0.4 ml of the composition prepared according to Example 7. The goods to liquor ratio is 1.15. At 70° is added 2.5% of C.I. Disperse Red 74 and 0.9% of C.I. Disperse Red 310, then heated to 130°. The development of the pH is as follows: 7.3 at the beginning, 6 at 100°, 5.5 at 130° and 4.4 after one hour at 130°.

EXAMPLE 28

In a winchbeck machine, at a temperature of 80°, a polyamide 6 carpet with a polypropylene backing is dyed in a bath containing, per 1000 parts, 0.2 parts caustic soda (36° Bé), 0.3% of C.I. Acid Yellow 219, 0.08% of C.I. Acid Red 57 and 0.07%, C.I. Acid Blue 288 (these percentages being based on the weight of the substrate). The liquor to goods ratio is 30:1. During movement of the carpet over the winch arms the bath is quickly heated to 90° to 95°, this temperature is maintained for 15 minutes and 1 part of the composition of Example 10 c) is added dispersed in 30 times its own volume of alkalinised water (3 parts of 20% ammonia per 100 parts water). After this addition, treatment is continued at 90° to 95° for 45 minutes, the pH of the bath falling gradually from 8.5 to 4.6. The carpet is dyed a uniform gold colour and the bath fully exhausted, being usuable for preparation of a fresh bath with consequent economy of water and energy.

EXAMPLE 29

In a dyeing apparatus a woollen substrate is treated with an aqueous bath, at 25° to 30°, containing, per liter, 20 ml of 35% hydrogen peroxide, 1 ml of a commercial stabiliser for hydrogen peroxide in alkaline media (Stabiliser AWN-Sandoz), 0.25 g sodium carbonate, sufficient acetic acid to adjust the pH to 8 to 8.1, and 0.3 ml of the composition of Example 7. The bath temperature is raised to 70° C. over 40 minutes and the pH of the bath drops from 7.8, after addition of the Example 7 composition, to 6.8 at the end of the treatment. A well bleached wool substrate is obtained.

Because of employment of the composition of Example 7, further treatment can be continued as follows:

After removal of the wool, the volume of the bath is adjusted to its initial level and there is added thereto 20% of the initially added amount of hydrogen peroxide, 40% of the initially added amount of stabiliser and, to readjust the pH to a level of 7.8, 10% of the initial quantity of sodium carbonate and 12.5% of the initial quantity of the Example 7 composition. To this bath is then added a fresh woollen substrate and the above described procedure repeated. A similar bleaching effect takes place. This mode of operation affords a saving of water and energy.

EXAMPLE 30

In a dyeing autoclave a polyamide 6 fabric is impregnated at 30° with a bath containing 3% of a levelling agent and 0.2 g/l of borax. The following dyes are then added 1.1% C.I. Acid Yellow 151
0.4% C.I. Acid Red 217 and
2.4% C.I. Acid Orange 82

(the percentages being based on the weight of the substrate). The liquor to goods ratio is 10:1. After raising the bath to 100° at a rate of 3° per minute, the temperature is held for 10 minutes and there is added 1.5 ml per liter of bath of the composition described in Example 10 c) dispersed in 30 times its own volume of alkalinated water (3 parts 30% ammonia per 100 parts water). Treatment is continued at 100° for a further 30 to 45 minutes. A uniform rust dyeing is obtained with good bath exhaustion.

EXAMPLE 31

The procedure of Example 30 is followed, but after 10 minutes at 100° there is added 0.5 ml per liter bath of γ-butyrolactone and the temperature held for 20 to 30 minutes at 100° C. when 0.3 to 0.4 ml per liter bath of the composition of Example 10 c) is added and the treatment at 100° C. continued for a further 30 minutes. At the end of the treatment the bath pH is 5.5. Again, a rust coloured dyeing is obtained with very good bath exhaustion.

EXAMPLE 32

A cut pile polyamide carpet with a polypropylene backing is dyed at a temperature approaching boiling point in an aqueous bath to which is added, at the elevated temperature, per 2000 parts bath, 1.8 parts of C.I. Acid Orange 156
1.3 parts of C.I. Acid Red 57
1.8 pars of C.I. Acid Blue 40
0.4 parts of a commercial wetting and levelling agent base on an aromatic sulphonate and
0.4 parts of 100% sodium hydroxide.

The pH value of the bath, after the addition was 8.5. The elevated temperature (ca. 92°-95° C.) was maintained for 20-30 minutes to achieve level distribution of the dyestuffs.

The pH of the bath is reduced to 4.5 over 10 to 20 minutes by gradual addition of 20 parts of monochloroacetic acid glycol ester. The addition is controlled by means of a pH stearing apparatus whereby the pH of the bath is continuously measured and additions metered into the bath to control the pH according to a predetermined pH curve, for example to achieve a pH gradient of 1 pH unit per 2.5 minutes until the terminal pH of 4.5 is reached. Fixation continues for 10 minutes after addition of the ester, resulting in a level dyeing with practically fully exhausted bath.

What is claimed is:

1. In a textile finishing process in which there is employed a pH regulator, the improvement comprising employing as pH regulator a compound of the formula I'

$$X-CH_2-CO-[O-(CH_2)_2]_{p'}-O-A' \qquad I'$$

wherein either p' is O and A' is $C_{4-8}$ alkyl, a radical $$-CH_2-\underset{\underset{OH}{|}}{CH}-(CH_2)_r-OH$$

or a radical $$-CH_2-\underset{\underset{OH}{|}}{CH}-(CH_2)_r-O-CO-CH_2X$$

or p' is 1 to 4 and A' is hydrogen, methyl, ethyl, butyl, phenyl, a radical $$-CH_2-(CH_2)_r-OH,$$

a radical $$-CH_2-(CH_2)_r-O-CO-CH_2X$$

or a radical $-CO-CH_2X$

X is halogen, and r is 1 to 4.

2. A process according to claim 1 wherein the pH of the treatment bath is decreased by 1 to 4 units between commencement and termination.

3. The process of claim 2, wherein A' is hydrogen or $-CO-CH_2X$.

4. The process of claim 2, wherein the compound of formula I' is a compound of formula I'', $$Cl-CH_2-CO+O-(CH_2)_2]_{p''}O-A'' \qquad I''$$

where p'' is 1 or 2 and A'' is hydrogen, ethyl, phenyl or a radical $-CO-CH_2Cl$.

5. A process of claim 4, wherein A'' is hydrogen or $-CO-CH_2Cl$.

6. The process of claim 2, which is a dyeing, optical brightening or bleach-oxidising process.

7. The process of claim 6, which is a dyeing process.

8. The process of claim 3, wherein the pH at commencement of the process is between 5 and 10 and at the end thereof is between 3 and 6.5, there having been a drop in pH caused at least partially by the use of the compound of formula I'.

9. The process of claim 8, wherein the pH at commencement is between 6 and 9 and at termination is between 4 and 6.

10. The process of claim 3, wherein the temperature of the finishing medium is raised during the process, the compound of formula I' being added whilst the medium is at the relatively low commencement temperature, during the period the temperature of the medium is being raised or during any temperature holding stage at the terminal elevated temperature.

11. The process of claim 3, wherein the compound of formula I' is employed in a composition form together with an emulsifying agent.

12. The process of claim 11, wherein said emulsifying agent is non-ionic or anionic or a mixture of a non-ionic and anionic emulsifying agent.

13. The process of claim 12, wherein the emulsifying agent is an addition product of ethylene oxide with a mono- or di-alkylphenol, a polyethoxylated vegetable oil, a fatty acid ester of a polyethylene glycol, a fatty acid alcohol sulphate, an alkyl sulpho-succinate, or a mixture of two or more thereof.

14. A composition, for use in the process of claim 4, comprising a compound of formula I'', stated in claim 4, together with an emulsifying agent.

15. A process according to claim 5 wherein A'' is hydrogen.

* * * * *